US010128547B2

(12) United States Patent
Fujimaki et al.

(10) Patent No.: US 10,128,547 B2
(45) Date of Patent: Nov. 13, 2018

(54) METHOD FOR PRODUCING SECONDARY BATTERY

(75) Inventors: Hisataka Fujimaki, Nisshin (JP); Hiroshi Kawadu, Toyota (JP); Shinya Kamada, Toyota (JP); Hisanao Kojima, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 1123 days.

(21) Appl. No.: 14/377,968

(22) PCT Filed: Feb. 16, 2012

(86) PCT No.: PCT/JP2012/053707
§ 371 (c)(1),
(2), (4) Date: Aug. 11, 2014

(87) PCT Pub. No.: WO2013/121563
PCT Pub. Date: Aug. 22, 2013

(65) Prior Publication Data
US 2015/0037669 A1    Feb. 5, 2015

(51) Int. Cl.
*H01M 10/44* (2006.01)
*H01M 10/058* (2010.01)
(Continued)

(52) U.S. Cl.
CPC ........... *H01M 10/446* (2013.01); *B60L 11/18* (2013.01); *H01M 4/0469* (2013.01);
(Continued)

(58) Field of Classification Search
CPC ............. H01M 10/049; H01M 10/052; H01M 10/0525; H01M 10/058; H01M 10/0585;
(Continued)

(56) References Cited

U.S. PATENT DOCUMENTS

2002/0051904 A1\* 5/2002 Itoh ................... H01M 10/0413
429/149
2003/0068562 A1\* 4/2003 Kim ................... H01M 10/052
429/326

(Continued)

FOREIGN PATENT DOCUMENTS

JP      2005-243537      9/2005
JP      2005243537 A  \*  9/2005
(Continued)

Primary Examiner — Barbara L Gilliam
Assistant Examiner — Adam A Arciero
(74) Attorney, Agent, or Firm — Finnegan, Henderson, Farabow, Garrett & Dunner, LLP

(57) ABSTRACT

Provided is a method for producing a lithium secondary battery in which localized precipitation of a foreign metal in the negative electrode can be reliably suppressed in a shorter time, regardless of, for instance, electrode type or electrode variability. The production method is a method for producing a secondary battery that includes a positive electrode provided with a positive electrode active material layer, a negative electrode provided with a negative electrode active material layer, and a nonaqueous electrolyte. The method comprises a step of constructing a cell including the positive electrode, the negative electrode and the nonaqueous electrolyte; a micro-charging step of performing charging over one hour or longer, up to 0.01% to 0.5% of the capacity of the constructed cell, in a state of charge such that a positive electrode potential is equal to or higher than an oxidation potential of iron (Fe), and a negative electrode potential is equal to or higher than a reduction potential of iron (Fe), and maintaining the state of charge; and a step of performing an initial conditioning charging.

9 Claims, 13 Drawing Sheets

(51) Int. Cl.
*H01M 10/052* (2010.01)
*B60L 11/18* (2006.01)
*H01M 4/04* (2006.01)
*H01M 10/04* (2006.01)
H01M 10/0525 (2010.01)
H01M 10/0585 (2010.01)
H01M 4/505 (2010.01)
H01M 4/525 (2010.01)
H01M 4/587 (2010.01)
H02J 7/00 (2006.01)

(52) U.S. Cl.
CPC ....... *H01M 10/049* (2013.01); *H01M 10/058* (2013.01); *H01M 4/505* (2013.01); *H01M 4/525* (2013.01); *H01M 4/587* (2013.01); *H01M 10/052* (2013.01); *H01M 10/0525* (2013.01); *H01M 10/0585* (2013.01); *H01M 2220/20* (2013.01); *H02J 7/0073* (2013.01); *Y02E 60/122* (2013.01); *Y02P 70/54* (2015.11); *Y10T 29/49108* (2015.01)

(58) Field of Classification Search
CPC ........... H01M 10/446; H01M 2220/20; H01M 4/0469; H01M 4/505; H01M 4/525; H01M 4/587
See application file for complete search history.

(56) References Cited

U.S. PATENT DOCUMENTS

2011/0121790 A1\* 5/2011 Brandon, II .......... H02J 7/0003
320/160
2013/0255075 A1 10/2013 Fujimaki et al.
2013/0330577 A1\* 12/2013 Kristofek ............ H01M 2/1077
429/50

FOREIGN PATENT DOCUMENTS

| JP | 2006-86060 | 3/2006 |
| JP | 2007-18963 | 1/2007 |
| JP | 2007-42486 | 2/2007 |
| JP | 2013-84400 | 5/2013 |
| WO | WO 2012/081128 A1 | 6/2012 |
| WO | WO 2013/035187 A1 | 3/2013 |

\* cited by examiner

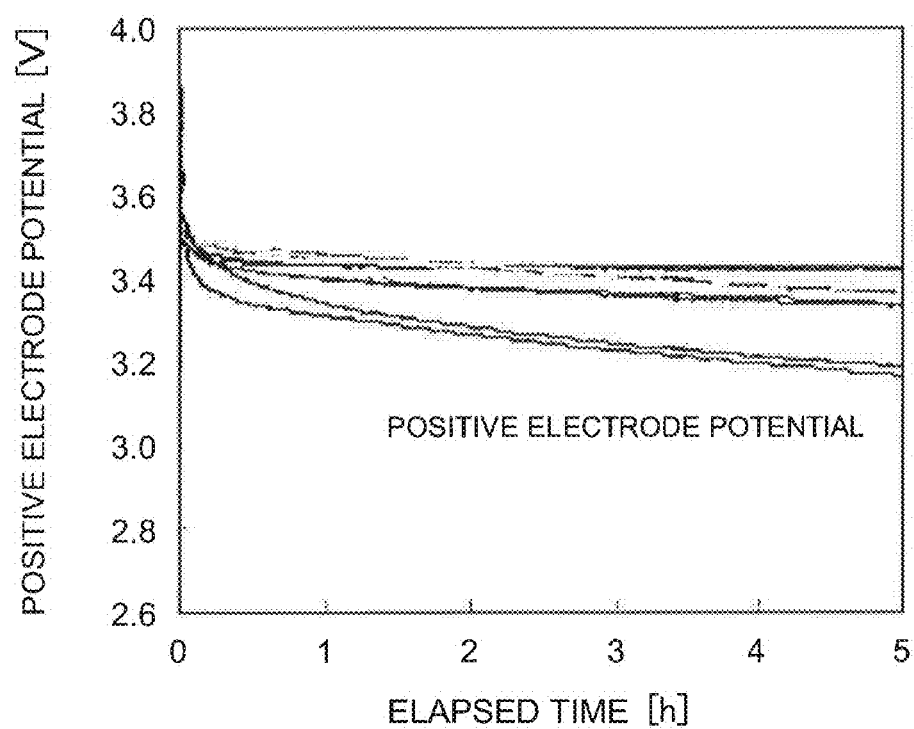

METHOD FOR PRODUCING SECONDARY BATTERY

CROSS-REFERENCE TO RELATED APPLICATIONS

This application is a national phase application of International Application No. PCT/JP2012/053707, filed Feb. 16, 2012, the content of which is incorporated herein by reference.

TECHNICAL FIELD

The present invention relates to a method for producing a secondary battery, and more particularly, to a method for producing a secondary battery that addresses the problem of short-circuits caused by precipitation of a foreign metal that is mixed into the battery.

BACKGROUND ART

Chargeable and dischargeable secondary batteries such as lithium secondary batteries have come to be widely used in recent years. Typically, such lithium secondary batteries are provided with a positive electrode and a negative electrode containing, respectively, a positive electrode active material and a negative electrode active material that are capable of storing and releasing lithium ions, a separator that is interposed between the positive electrode and the negative electrode, and a nonaqueous electrolyte that impregnates the positive electrode, the negative electrode and the separator. To produce the lithium secondary battery, the positive electrode, the negative electrode and the separator are assembled, and are impregnated with the nonaqueous electrolyte, followed by charging.

As is known, external foreign metals such as iron (Fe) or the like can be inevitably mixed into the secondary battery during production of the secondary battery. It has also been observed that when such a foreign metal is present in the vicinity of the positive electrode, the foreign metal dissolves in the nonaqueous electrolyte during charging of the battery (for instance, during initial conditioning), and goes on precipitating locally at sites opposing the negative electrode, as a result of which the separator may be pierced and short-circuits may occur. Accordingly, various methods have been proposed (hereafter also referred to simply as abatement treatment methods of foreign metals) that are carried out, after construction of a secondary battery and before initial conditioning, with a view to preventing short-circuits in the secondary battery caused by foreign metals in the secondary battery (for instance, Patent Literature 1 to 4).

For instance, Patent Literature 1 discloses a method that involves providing a standing time, ranging from one hour to 48 hours, after charging to a battery capacity of 0.01% to 0.1% during initial charging.

Further, Patent Literature 2 discloses the feature of applying an electrical shock of charge and discharge, or a combination of charge and discharge, to a battery, such that the shock is applied under a condition whereby the positive electrode potential is 4.0 V or higher and the negative electrode potential one minute after the battery is left to stand, subsequently to application of the shock, is 2.0 V or higher, with respect to Li.

In these methods, the foreign metal diffuses homogeneously in the electrolyte, without precipitating on the negative electrode.

Apart from abatement treatment methods of foreign metal such as those described above, self-discharge inspection is ordinarily performed that involves determining the occurrence or absence of internal short circuits by measuring the amount of voltage drop (self-discharge amount), in an unloaded state, of the secondary battery after initial conditioning. Self-discharge inspection involves checking the occurrence or absence of micro-short-circuits caused by foreign metal precipitation. However, inspection lasting 5 or more days, for instance about 10 days, was required to check the occurrence or absence of micro-short-circuits caused by precipitation of high-resistance iron.

CITATION LIST

Patent Literature

Patent Literature 1: Japanese Patent Application No. 2005-243537
Patent Literature 2: Japanese Patent Application No. 2007-018963
Patent Literature 3: Japanese Patent Application No. 2006-086060
Patent Literature 4: Japanese Patent Application No. 2007-042486

SUMMARY OF INVENTION

Technical Problem

In attempting to elicit dissolution of a foreign metal on a positive electrode of a secondary battery in accordance with the method disclosed in Patent Literature 1, instances may arise wherein, for example as illustrated in FIG. 10A, the dissolution rate of the foreign metal drops, as a result of the drop in the positive electrode potential while the battery is standing, and a longer time may be required in order to thoroughly dissolve the foreign metal. The initial negative electrode potential is lower than the redox potential of Fe (for instance, 2.5 V with respect to Li); accordingly, Fe might precipitate on the negative electrode. This tendency is pronounced in batteries that utilize an electrode material, for instance a ternary lithium transition metal complex oxide, which has a comparatively low capacity retention rate.

In attempting to elicit dissolution of a foreign metal on the positive electrode of a secondary battery in accordance with the method disclosed in Patent Literature 2, variability arose in the positive electrode potential in the battery left to stand, as illustrated in, for instance, FIG. 10B. This variability is deemed to derive from the influence of variability between batches of electrode materials, despite the fact that batteries are produced according to identical specifications. The duration of time over which the foreign metal can be abated exhibits likewise variability, and it has been necessary to set a longer treatment time so as to abate foreign metals more reliably.

An object of the present invention, which was arrived at in order to solve the above-described conventional problems, is to provide a method for producing a lithium secondary battery in which localized precipitation of a foreign metal on the negative electrode can be reliably suppressed in a shorter time, regardless of, for instance, electrode type or electrode variability. A further object of the present invention is to provide a highly reliable lithium secondary battery in which short-circuits do not occur readily and that is obtained in accordance with the above production method.

Solution to Problem

The inventors carried out extensive research on the dissolution behavior of foreign metals such as iron (Fe) that are inevitably mixed in during the production process. As a result, the inventors found that the dissolution behavior of foreign metals is significantly influenced by subtle changes in battery configuration, and that the dissolution behavior may in turn affect the potential behavior in the foreign metal abatement treatment. Factors that influence the potential behavior include, for instance, variability between electrode types and electrode batches, and also, for example, design differences in terms of, among others, the concentration of additives in the electrolyte, as well as unintended variability in the influence of the storage conditions of the electrodes. However, the inventors found that the dissolution behavior of foreign metals can be stabilized, and the time required for the abatement treatment can be shortened, by controlling and curtailing such influences on potential behavior, and by securing an optimal potential state, at all times, and arrived at the present invention on the basis of that finding. The inventors found also that if there are observed influencing factors, other than potential behavior, on the dissolution behavior of a foreign metal, then the duration of a foreign metal abatement treatment can be appropriately set to lie within a range that takes into account the influence of the other factors.

Specifically, the method for producing a secondary battery disclosed herein is a method for producing a secondary battery that includes a positive electrode provided with a positive electrode active material layer, a negative electrode provided with a negative electrode active material layer, and a nonaqueous electrolyte. The production method comprises:

a step of constructing a cell including the positive electrode, the negative electrode and the nonaqueous electrolyte;

a micro-charging step of performing charging over one hour or longer, up to 0.01% to 0.5% of a capacity of the constructed cell, in a state of charge such that a positive electrode potential is equal to or higher than an oxidation potential of iron (Fe), and a negative electrode potential is equal to or higher than a reduction potential of iron (Fe), and maintaining the state of charge; and a step of performing an initial conditioning charging.

In the micro-charging step, very little charging, i.e. corresponding to 0.01% to 0.5% of the cell capacity, is carried out slowly over a sufficient time of one hour or longer. During early charging, the potential difference between the positive and negative electrodes can change sharply; as a result, the negative electrode potential may become unstable and drop below the iron (Fe) oxidation potential, or the potential may rise sharply. Drops and sharp rises of the negative electrode potential are accordingly curtailed, and precipitation of foreign metal is reliably prevented, thanks to such sluggish charging. The production method disclosed herein, specifically, involves no pulsed charging at all, i.e. no impact-charging over a very short time.

After a state of charge is reached where the positive electrode potential is equal to or higher than the oxidation potential of iron (Fe) and the negative electrode potential is equal to or higher than the reduction potential of iron (Fe), the battery is not just left as-is; instead, the state of charge is actively maintained and managed by maintaining the above potentials. Thanks to this feature, the foreign metal dissolves continually in the positive electrode while the dissolved metal ions can be prevented from precipitating on the negative electrode. As a result, the dissolved metal ions can diffuse homogeneously through a large volume of the electrolyte, and localized precipitation of the metal ions can be suppressed more reliably. The state of charge is maintained actively until the influence of the foreign metal is nullified. It becomes accordingly possible to suppress the influence of, for instance, electrode type and electrode variability.

The oxidation potential and the reduction potential of iron (Fe) are identical in an ideal state. In practice, however, the potential at which the oxidation reaction proceeds and the potential at which the reduction reaction proceeds are mismatched (overvoltage) due to the influence of, for instance, electrolyte additives and electrode materials. The oxidation potential and the reduction potential of iron (Fe) will be therefore distinguished from each other in the disclosure of the present description.

In a preferred aspect of the method for producing a secondary battery disclosed herein, the positive electrode potential is equal to or higher than the oxidation potential of iron (Fe) and lower than an oxidation potential of copper (Cu). From among metallic foreign bodies that may become mixed in during the production process of the secondary battery, conceivable foreign metals that are the target of abatement in such a production method include, foreign metals that have a redox potential within the operating voltage range of the secondary battery, and that might dissolve (ionize). Accordingly, those metals that, although being metallic foreign bodies that can conceivably contaminate the positive electrode and so forth, but have no chance of becoming ions (dissolving) within the operating voltage range of the secondary battery, do not constitute a cause of short-circuits, and need not be considered as foreign metals. Ordinarily, metals that can be regarded as such foreign metals include, for instance, iron (Fe), copper (Cu), tin (Sn), zinc (Zn), stainless steel and the like. In the micro-charging step disclosed herein, however, copper (Cu) is not considered as a foreign metal to be abated, since the positive electrode potential is set not to rise to or above the oxidation potential of copper (Cu). By virtue of such a feature, copper (Cu) does not dissolve in the positive electrode and precipitate on the negative electrode; accordingly, it becomes possible to reliably abate iron (Fe), which dissolves slowly on account of its higher resistance. Although foreign metals are actively dissolved in the invention disclosed herein, copper (Cu), which is used also as a negative electrode collector, can be excluded from such targets of active dissolution.

In a preferred aspect of the method for producing a secondary battery disclosed herein, the micro-charging step is performed by constant-current constant-voltage (CC-CV) charging, and a current at the time of CC charging is set to 0.01 C or less. As described above, the potential difference between the positive and negative electrodes may change sharply during early charging. By virtue of the above configuration, the current at the time of charging is lowered to 0.01 C or less, and potential is prevented from rising sharply. The precision of potential adjustment can be enhanced as a result.

In a preferred aspect of the method for producing a secondary battery disclosed herein, a potential difference between the positive and negative electrodes at the time of CV charging in the micro-charging step is set to range from 0.5 V to 1.3 V. By virtue of this feature, iron (Fe) can be caused to dissolve stably in the electrolyte in a shorter time, without precipitation of iron (Fe) or copper (Cu) on the negative electrode. The foreign metal abatement treatment can be performed in a short time thanks to the above feature.

In a preferred aspect of the method for producing a secondary battery disclosed herein, a potential difference between the negative electrode and an exterior can at the time of CV charging in the micro-charging step is set to range from −0.5 V to 0.2 V. The exterior can of secondary batteries is ordinarily formed out of a metal, typically aluminum or the aluminum alloy. Therefore, the potential between the positive and negative electrodes is set as described above, and the negative electrode potential is kept at or above the precipitation potential of aluminum or an aluminum alloy derived from the exterior can. It becomes possible as a result to prevent precipitation of a foreign metal such as aluminum or the aluminum alloy derived from the exterior can.

In a preferred aspect of the method for producing a secondary battery disclosed herein, the micro-charging step is performed by constant-current constant-voltage charging, and the state of charge is maintained from 5 hours to 24 hours. In such a configuration, dissolution of the foreign metal can be actively promoted; as a result, the foreign metal abatement treatment can be completed in a shorter time. Therefore, such a state of charge can be complete typically within 5 hours to 24 hours, and more restrictively, within about 10 hours to 20 hours.

In a preferred aspect of the method for producing a secondary battery disclosed herein, given a preset standard charging sustain time for a predetermined temperature region, a charging time is set in such a manner that charging over a time longer than the standard charging sustain time is performed when an actual environmental temperature is lower than the predetermined temperature region, and the charging time is set in such a manner that charging over a time shorter than the standard charging sustain time is performed when the actual environmental temperature is higher than the predetermined temperature region. The environmental temperature can exert a significant influence on the dissolution behavior of the foreign metal. By virtue of the above configuration, the influence of the environmental temperature on the dissolution behavior of the foreign metal can be nullified through appropriate adjustment of the charging time in the micro-charging step. Therefore, it becomes possible to perform the foreign metal abatement treatment in a shortest treatment time, in accordance with the state of the secondary battery that is to be treated.

In a preferred aspect of the method for producing a secondary battery disclosed herein, an assembled battery is constructed through electrical connection of a plurality of cells constructed in the cell construction step, and the micro-charging step is performed on the entirety of the constructed assembled battery. Such a configuration is convenient and more economical in that, for instance, the micro-charging step can be performed on a plurality of secondary batteries over a single treatment time, since the micro-charging step is performed with the secondary batteries in the state of an assembled battery resulting from connecting in series a plurality of secondary batteries (single cells).

In a preferred aspect of the method for producing a secondary battery disclosed herein, given a preset standard charging sustain time for a predetermined confining pressure region, a charging time is set in such a manner that charging over a time shorter than the standard charging sustain time is performed when an actual confining pressure is lower than the predetermined confining pressure region, and the charging time is set in such a manner that charging over a time longer than the standard charging sustain time is performed when the actual confining pressure is higher than the predetermined temperature region. The confining pressure of the cell can exert a significant influence on the dissolution behavior of the foreign metal. By virtue of the above configuration, the influence of the confining pressure on the dissolution behavior of the foreign metal can be nullified through appropriate adjustment of the charging time in the micro-charging step. Therefore, it becomes possible to perform the foreign metal abatement treatment in a shortest treatment time, in accordance with the state of the secondary battery that is to be treated.

In a preferred aspect of the method for producing a secondary battery disclosed herein, the method further comprises, after the initial conditioning charging step, a self-discharge inspection step of measuring a voltage drop amount of the charged cell, wherein the self-discharge inspection step is performed within 15 hours. The above production method allows the abatement treatment of the foreign metal to be carried out reliably. Accordingly, a secondary battery thus treated can exhibit a lower likelihood of short-circuits caused by localized precipitation of foreign metals, in particular a foreign metal formed of iron (Fe). Therefore, the likelihood of short-circuits caused by a high-resistance foreign metal (iron (Fe)) that takes time to dissolve need not be addressed in a case where a self-discharge inspection step is performed subsequently, and, accordingly, the self-discharge inspection step can be performed in a very short time, for instance within 15 hours.

A secondary battery provided according to another aspect of the invention disclosed herein is characterized by being produced in accordance with any one of the production methods above. Such a secondary battery may be in the state of a single cell, or in the form of an assembled battery resulting from electrically connecting two or more cells. Foreign metals can be reliably abated in such as secondary battery, and the secondary battery can exhibit high reliability in that the likelihood of short-circuits caused by localized precipitation of a foreign metal is sufficiently reduced. Further, the abatement treatment and self-discharge inspection can be conducted in a shorter time, and, accordingly, the time spent in these processes can be reduced, which translates into higher productivity and better economy. Accordingly, such a secondary battery can be suitably used, in particular, as a driving power source that is installed in a vehicle, such as an automobile, from which high safety and reliability are demanded. The present invention, therefore, can also provide a vehicle 1, such as an automobile, that is equipped with such a secondary battery 10 (also in the form of an assembled battery 100) as a power source of a vehicle driving motor (electric motor) or the like, for instance as illustrated in FIG. 6. The type of the vehicle 1 is not particularly limited, and the vehicle may be typically a hybrid automobile, an electric automobile, a fuel cell automobile or the like.

BRIEF DESCRIPTION OF DRAWINGS

FIG. 10B is a diagram illustrating another example of potential behavior in a conventional abatement treatment step of a foreign metal.

DESCRIPTION OF EMBODIMENTS

Figure 1:
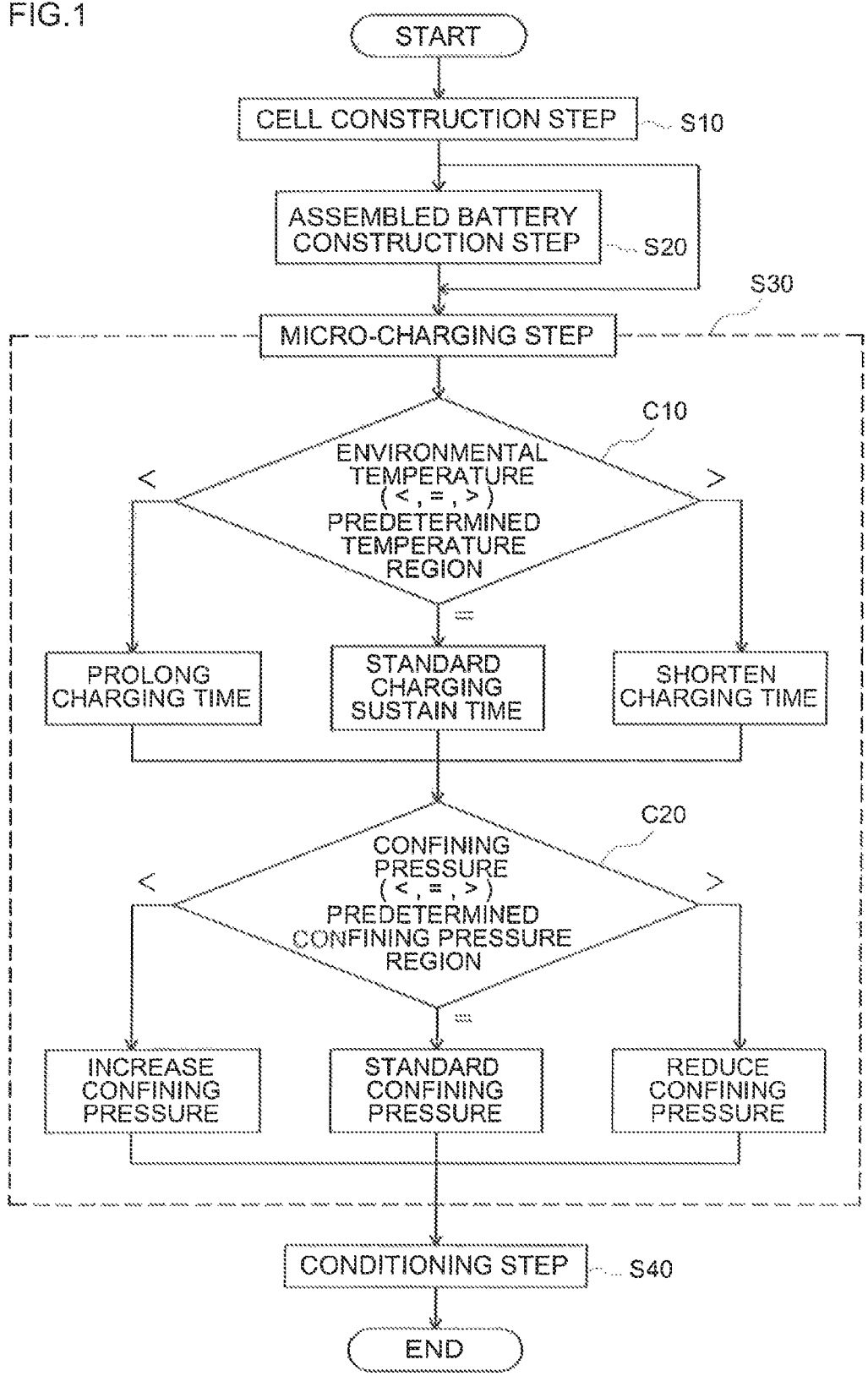
FIG. 1 is a process flow diagram according to an embodiment of the present invention.

Preferred embodiments of the present invention are explained next with reference to accompanying drawings. Any features other than the features specifically set forth in the present description and which may be necessary for carrying out the present invention can be regarded as instances of design matter for a person skilled in the art on the basis of known techniques in the technical field in question. The present invention can be carried out thus on the basis of the features disclosed in the present description and on the basis of common technical knowledge in the relevant technical field.

In the present description, the term "secondary battery" denotes ordinarily a battery that can be repeatedly charged and discharged as a result of charge transfer, and encompasses typically, for instance, nickel hydride batteries, lithium secondary batteries, lithium polymer batteries and the like.

In the present description, the term "active material" denotes a substance which, in a secondary battery, can reversibly store and release (typically through intercalation and deintercalation) a chemical species that constitutes a charge carrier (for instance, lithium ions in a lithium ion battery).

The production method according to the present embodiment is a method for producing a secondary battery that includes a positive electrode provided with a positive electrode active material layer, a negative electrode provided with a negative electrode active material layer, and a nonaqueous electrolyte. Secondary batteries can typically have a separator interposed between the positive electrode and the negative electrode.

In such a secondary battery, a step of constructing a cell (i.e. the structure that makes up the secondary battery) involves assembling the positive electrode, typically a separator, and the negative electrode, accommodating the foregoing in a battery case together with the nonaqueous electrolyte, and sealing the battery case, to yield a cell. When assembling the secondary battery (cell), in some instances, a foreign metal such as copper, iron or the like, derived for example from sliding members in the production apparatus, may become incorporated into the positive electrode (for instance, into the positive electrode active material layer that is formed on, for instance, a positive electrode collector). When the positive electrode contains a foreign metal, the foreign metal may dissolve, to yield metal ions, if the potential of the positive electrode during charging is higher than the dissolution potential of the foreign metal. Metal ions move ordinarily in a straight line, between the positive and negative electrodes (typically, through the separator), towards the negative electrode. When charging continues, metal ions reach the negative electrode and precipitate locally at positions opposing the negative electrode. As such charging proceeds the precipitate on the negative electrode grows gradually towards the positive electrode side.

As a characterizing feature of the present embodiment, a cell constructed as described above is subjected to a foreign metal abatement that encompasses a below-described micro-charging step, prior to initial conditioning charging, with a view to suppressing growth of such precipitates. In particular, there is reliably performed an abatement treatment of iron (Fe), which has comparatively high resistance and does not dissolve readily in the electrolyte (takes time to dissolve), and which is taken herein as the main foreign metal to be dissolved.

The invention disclosed herein will be explained on the basis of an example where a lithium secondary battery is produced as the secondary battery.

Figure 2:
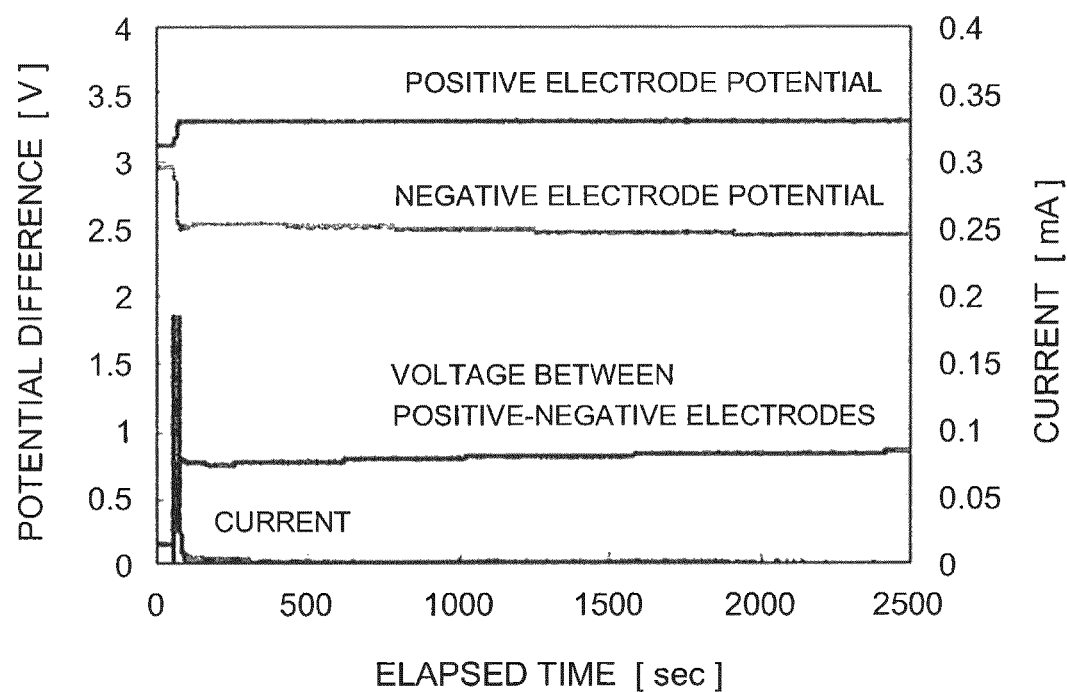
FIG. 2 is a diagram illustrating an example of potential behavior in a production method of the present invention.

FIG. 1 is a flow diagram illustrating an embodiment of the method for producing a secondary battery disclosed herein. FIG. 2 is a diagram for explaining the potential state in a micro-charging step performed on a lithium secondary battery of the embodiment. The plot lines in the figure represent, from the top of the graph downward, the changes in time for the positive electrode potential, the negative electrode potential, the potential difference between the positive electrode and the negative electrode (hereafter also referred to as voltage between the positive and negative electrodes), and the current that is supplied.

For instance, as illustrated in FIG. 1, the micro-charging step (S30) can be performed on a cell (single cell), after construction of the cell in a cell construction step (S10), or can be performed, alternatively, on an assembled battery that is constructed through electrical connection of a plurality of single cells, after an assembled battery construction step (S20).

In the micro-filling step (S30), charging is performed to a state of charge such that the positive electrode potential with respect a standard electrode of metallic lithium (Li) is equal to or higher than the oxidation potential of iron (Fe) and the negative electrode potential is equal to or higher than the reduction potential of iron (Fe), as illustrated for instance by the change of the positive electrode potential and the negative electrode potential over time in FIG. 2, and this state of charge is maintained.

Control is performed such that in the above state of charge, the positive electrode potential is equal to or higher than the oxidation potential of iron (Fe) and the negative electrode potential is equal to or higher than the reduction potential of iron (Fe) at all times, i.e. a state is brought about wherein iron (Fe) and metal species the oxidation potential (dissolution potential) whereof is lower than that of iron can be reliably dissolved in the positive electrode at all times, but the dissolved metal species cannot precipitate on the negative electrode. Specifically, iron (Fe) and metal species the dissolution potential whereof is lower than that of iron are assumed to be the metal species that are reliably dissolved in the positive electrode in the micro-charging step. For instance, copper (Cu), which is a metal species having a higher oxidation potential than that of iron (Fe), can be excluded from the species targeted in the micro-charging step. In the present embodiment, an instance is illustrated wherein the oxidation potential of iron (Fe) is about 2.5 V (with respect to Li), but the oxidation potential of iron (Fe) is not limited to that value, and may be set taking as a reference the actual oxidation potential of iron (Fe) in the cell of interest.

Preferably, the positive electrode potential is equal to or higher than the oxidation potential of iron (Fe) and lower than the oxidation potential of copper (Cu). If the positive electrode potential is higher than the oxidation potential of copper (Cu), the copper can dissolve in the positive electrode, but the dissolved copper (Cu) (i.e. Cu ions) migrate towards the negative electrode. The negative electrode potential is equal to or higher than the reduction potential of iron (Fe) but lower than the reduction potential of copper (Cu), and hence the Cu ions that reach the negative electrode are reduced immediately and can precipitate on the negative electrode. Such Cu precipitation is undesirable, since it may occur locally. In the micro-charging step, therefore, the positive electrode potential is preferably in a state such that dissolution of copper (Cu) does not occur. Preferably, the positive electrode potential is set to be as high as possible while being lower than the oxidation potential of copper (Cu).

It is essential herein that charging be performed at a sluggish charging rate, with application of charge for one hour or longer up to 0.01% to 0.5% of the cell capacity. Ordinarily, the potential of the positive electrode and the negative electrode after electrolyte impregnation is for instance of about 3.0 V (with respect to Li). Rapid charging during early charging at an ordinary charging rate may give rise to sharp changes in the potentials of the positive and negative electrodes. In the invention disclosed herein, performing charging at such a sluggish charging rate allows preventing sharp changes in the potential of the positive and negative electrodes, and allows maintaining the potentials of the positive electrode and the negative electrode equal to or higher than the reduction potential of iron (Fe) at all times. Accordingly, no iron (Fe) precipitates on the negative electrode.

Figure 3:
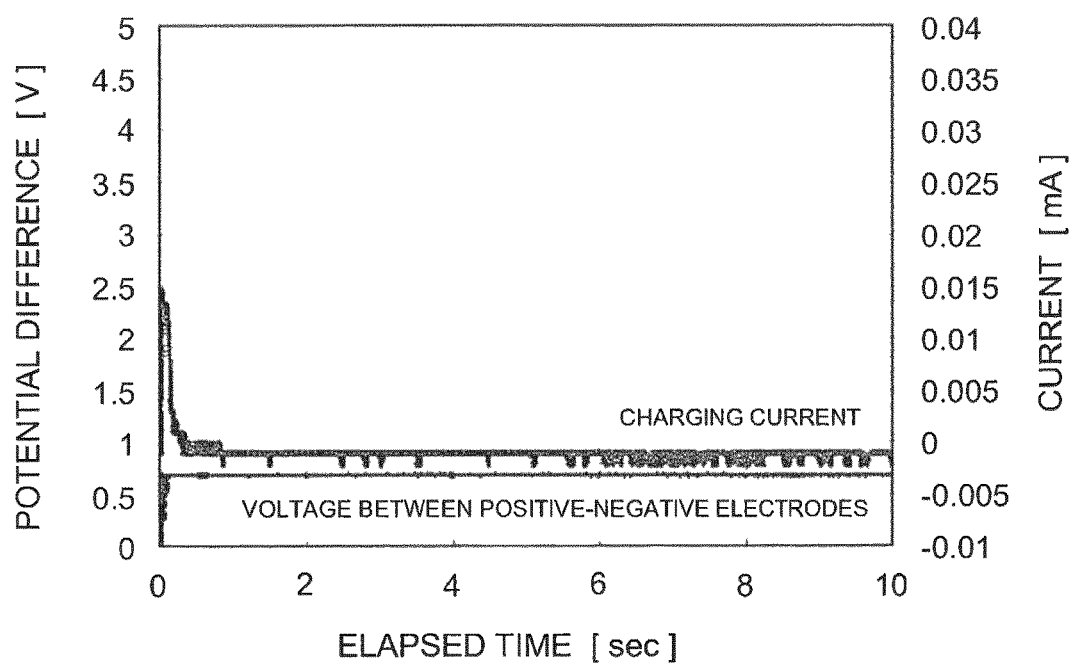
FIG. 3 is a diagram illustrating a relationship extracted between elapsed time and charging current and voltage between the positive and negative electrodes in FIG. 2.
Figure 4:
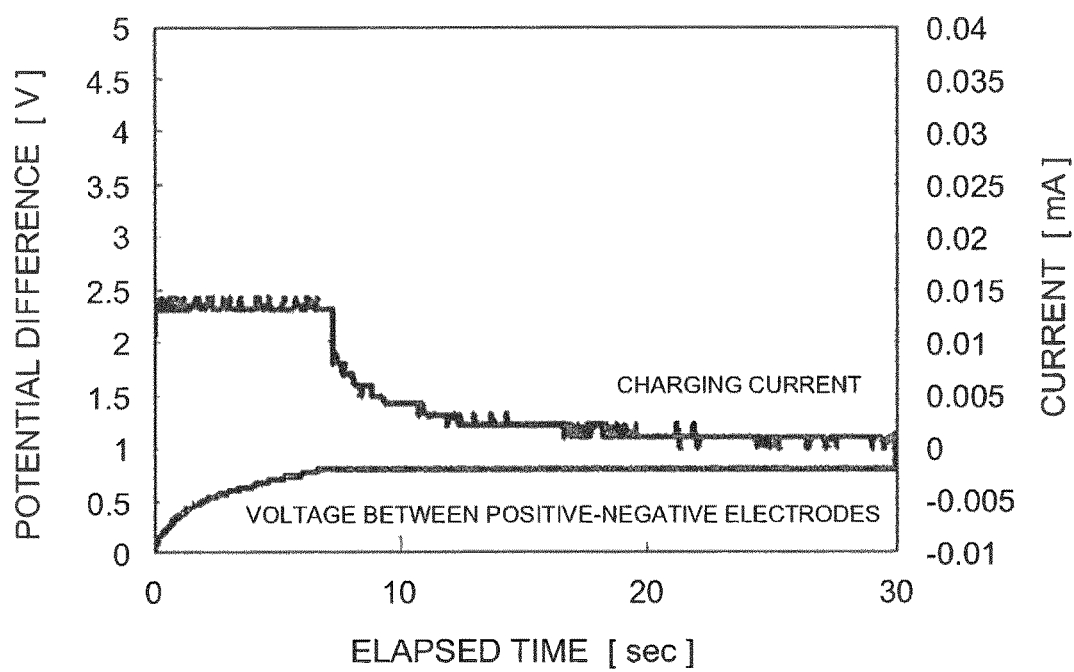
FIG. 4 is a diagram illustrating an enlargement of the charging current and voltage between the positive and negative electrodes in FIG. 3, up to an elapsed time of 30 minutes.

FIG. 3 illustrates only the way in which current and voltage between the positive and negative electrodes in FIG. 1 change over time. FIG. 4 is a diagram illustrating an enlarged region of the elapsed time in FIG. 3 up to the 30-minute mark. By performing charging at such a sluggish charging rate, it becomes possible to prevent changes in the voltage between the positive and negative electrodes, which are characteristic of early charging, and it becomes possible to adjust and control potential with higher precision, for instance as illustrated in FIG. 4.

Preferably, charging to the above state of charge is performed by constant-current constant-voltage (CC-CV) charging. Potential can be controlled with yet higher precision by resorting to CC-CV charging. For instance, CC charging over one hour to 0.01% of the cell capacity corresponds to a current of 0.01 C. Charging at a more sluggish charging rate is desirable in the micro-charging step disclosed herein; accordingly, current at the time of CC charging is preferably set to be 0.01 C or less, for instance 0.008 C or less, and more restrictively, 0.005 C or less.

Preferably, the voltage between the positive and negative electrodes at the time of CV charging is set to range from 0.5 V to 1.3 V. The abatement treatment is possible even if the voltage between the positive and negative electrodes is lower than 0.5 V. However, a voltage between the positive and negative electrodes lower than 0.5 V is undesirable, since in this case a longer time than necessary is required in order to dissolve the foreign metal. Preferably, therefore, the voltage between the positive and negative electrodes is set to 0.5 V or higher, from the viewpoint of increasing the dissolution rate of the foreign metal that is dissolved in the positive electrode, and of shortening the time required for the abatement treatment. The abatement treatment is possible even if the voltage between the positive and negative electrodes exceeds 1.3 V. However, this is undesirable, since securing a voltage between the positive and negative electrodes in excess of 1.3 V requires stricter management of the positive electrode potential and the negative electrode potential, and also because there increases the likelihood of the positive electrode being at or above the oxidation potential of copper (Cu), whereupon copper (Cu) precipitates on the negative electrode, or conversely, the likelihood that the negative electrode is at or below the reduction potential of iron (Fe), whereupon iron (Fe) precipitates on the negative electrode. Studies by the inventors have revealed that, although with changing conditions depending on various circumstances, precipitation of iron (Fe) in for instance the negative electrode can be observed from around the point at which the positive-negative voltage exceeds about 1.3 V in the micro-charging step. Such being the case, a suitable example aimed at performing the abatement treatment more stably and in a shorter time involves, as a yardstick, setting the voltage between the positive and negative electrodes to a range from 0.5 V to 1.3 V, for instance, from 0.6 V to 1.0 V, preferably, from 0.7 V to 0.9 V, and more restrictively to a range of about 0.8±0.05 V.

Preferably, the potential difference between the negative electrode and an exterior can at the time of CV charging in the micro-charging step is set to range from −0.5 V to 0.2 V. This potential difference is a value defined on the basis of the precipitation potential of aluminum (Al) in the electrolyte. The exterior can of a secondary battery is ordinarily formed out of a metal, typically aluminum or an aluminum alloy. The exterior is in contact with the electrolyte inside the battery during the abatement treatment, and accordingly exhibits potentials with respect to the positive electrode and the negative electrode. The respective potential between the exterior can and the positive electrode, and between the exterior can and the negative electrode, can be measured separately. Therefore, the battery is configured so that the potential between the positive and negative electrodes is set as described above, the potential between the exterior can and the negative electrode is measured, and the negative electrode potential is kept at or above the precipitation potential of aluminum or an aluminum alloy derived from the exterior can. Setting this way the potential difference between the negative electrode and the exterior can allows preventing precipitation of a foreign metal such as aluminum or an aluminum alloy derived from the exterior can. A safer secondary battery of superior quality can be produced by virtue of such a configuration.

The state of charge in the micro-charging step can be maintained until it is determined that the foreign metal that is to be abated had dissolved or diffused sufficiently. The sustain time of the state of charge can be mainly established, for instance, by taking into consideration (1) the size of the foreign metal including iron (Fe) having a comparatively low dissolution rate, (2) positive-negative voltage, and (3) the total treatment time as targeted. A state of charge maintained for a duration in the range from 5 hours to 24 hours can be taken as one yardstick in the method disclosed herein. The sustain time can be grasped as a sustain time such that the duration of time over which iron (Fe) particles having diameter of 200 μm and a thickness of 10 μm dissolve completely in 10 hours, and foreign metal abatement can be completed approximately within a range of time that encompasses 10 hours, namely from 5 hours (½ of 10 hours) to 24 hours (roughly over twice 10 hours), upon execution of the micro-charging step, for instance, under a condition of environmental temperature of 25° C. and voltage between the positive and negative electrodes of 0.8 V.

Detailed studies by the inventors have revealed that the charging sustain time required for dissolving for instance a foreign metal of predetermined size in the micro-charging step is influenced by various factors. Conceivable such factors include, for instance, the environmental temperature, the voltage between the positive and negative electrodes, and the foreign metal dissolution rate, as already illustrated, and also, for instance, differences and variability in the specifications of the constituent materials of the secondary battery. More specifically, conceivable influences that arise from differences in the specifications of the constituent materials of the secondary battery include, for instance, the types of the active materials, and the concentration of additives that are added to the electrolyte. Specifically, for instance, it has been found that the dissolution rate of the foreign metal tends to decrease as a result of an increase in the concentration of additives that are added to the electrolyte. Conceivable instances of variability in the constituent materials of the secondary battery include, for example, differences in non-manageable moisture content in the electrodes, the mixed-in state of the foreign metal (for instance, degree to which the foreign metal is buried in the positive electrode active material layer, degree of wetting with the electrolyte, among others), and the degree of impregnation of the electrodes and the separator with the electrolyte. Specifically, it has been found for instance that the dissolution rate of the foreign metal decreases when the storage period of the electrodes in a dry room is longer, or upon instant exposure to the atmosphere. These occurrences are deemed to arise as a result of an increase in the amount of moisture in the electrodes.

In the production method disclosed herein, therefore, the charging sustain time that allows performing the abatement treatment reliably in a shorter time can be set by taking into consideration also the influence of the factors exemplified above, and other influences. In the production method disclosed herein, for instance, the abatement treatment is set to be performed reliably over a more appropriate treatment time in accordance with the environment of the abatement treatment or in accordance with the state of the secondary battery, by relying on the below-described method. Specifically, the micro-charging step is executed beforehand, over a predetermined charging sustain time, by arranging the foreign metal (preferably, iron (Fe) particles) of a predetermined size on the positive electrode surface and by varying in several ways other conditions (herein, for instance, environmental temperature and confining pressure). The relationship between the dissolution amount of the foreign metal that is dissolved over a predetermined time and the conditions (environmental temperature and confining pressure) that are modified is ascertained beforehand; as a result, it becomes possible to set a shortest suitable charging sustain time for the actual environmental temperature.

Figure 8:
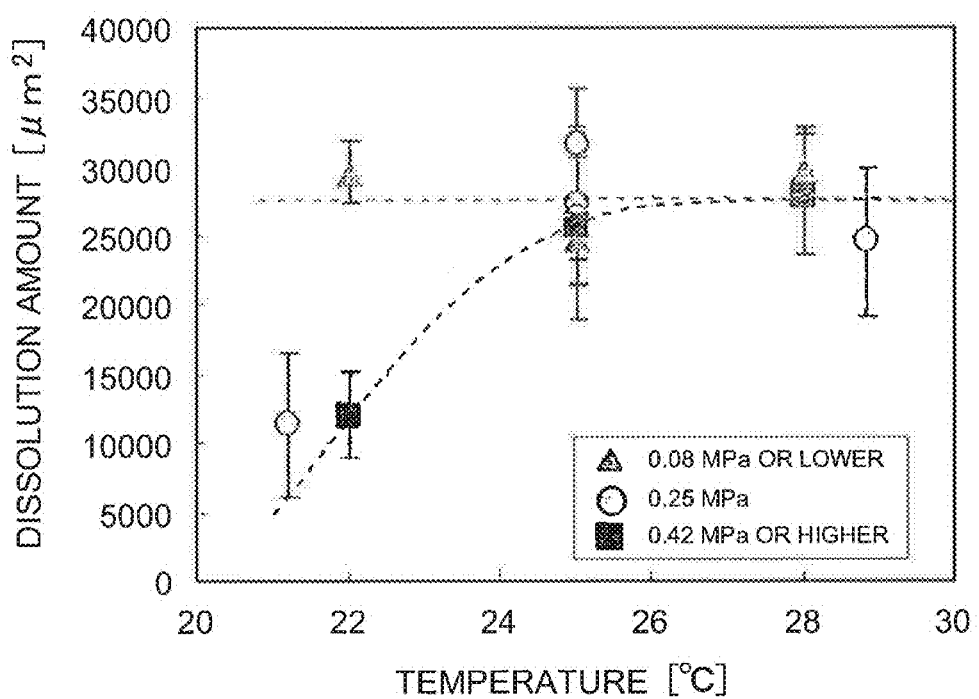
FIG. 8 is a diagram illustrating a relationship between temperature and dissolution amount of a foreign metal after a micro-charging step according to an embodiment.

FIG. 8 illustrates the relationship between the dissolution amount of iron (Fe) particles and environmental temperature upon execution of a micro-charging step by arranging iron (Fe) particles having a diameter of 200 μm and a thickness of 10 μm on the positive electrode, with the voltage between the positive and negative electrodes set to 0.8 V and the charging sustain time set to 10 hours, and by varying the environmental temperature. The confining pressure of the cell is also caused to vary in this example. As FIG. 8 shows, the dissolution amount of iron (Fe) particles is virtually unaffected by the environmental temperature when the iron lies in a temperature region of 25° C. or above; however, the dissolution amount decreases as the confining pressure increases, and dissolution takes time, at a temperature region below 25° C. More specifically, therefore, the charging time can be set, with respect to a standard charging sustain time for a predetermined temperature region set beforehand, in such a manner that charging is performed over a longer time than the standard charging sustain time when the actual environmental temperature is lower than the predetermined temperature region, and can be set in such a manner that charging is performed over a shorter time than the standard charging sustain time when the actual environmental temperature is higher than the predetermined temperature region, for instance as denoted by step C10 in FIG. 1. The duration of time prolonged or shortened with respect to the standard charging sustain time can be appropriately worked out on the basis of the relationship illustrated in FIG. 8.

Figure 9:
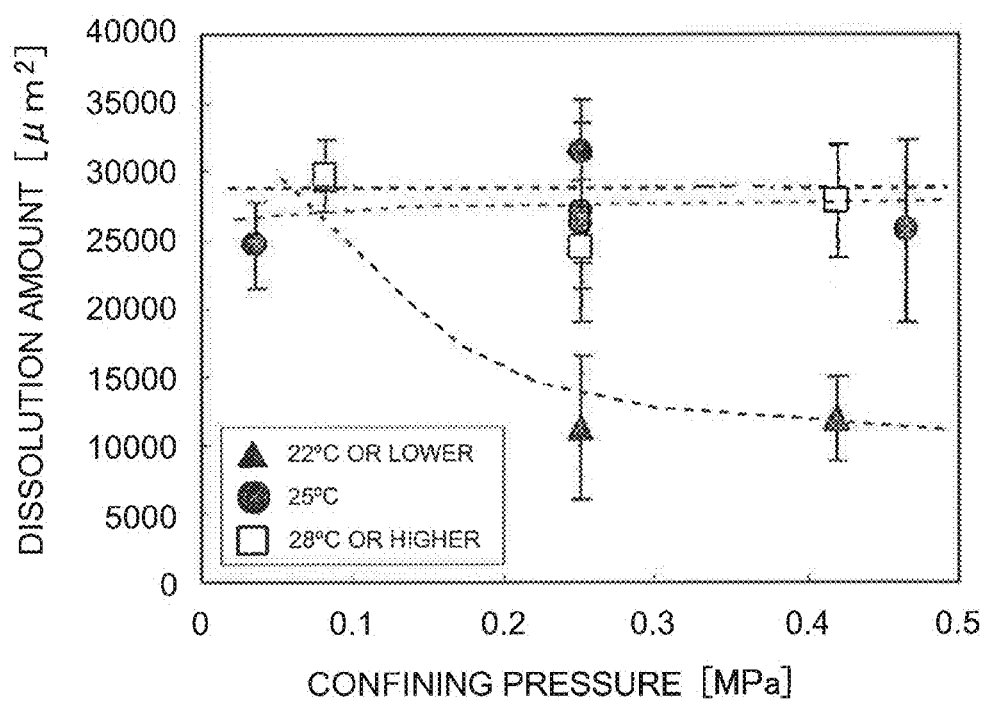
FIG. 9 is a diagram illustrating a relationship between confining pressure and dissolution amount of a foreign metal after a micro-charging step according to an embodiment.
Figure 10A:
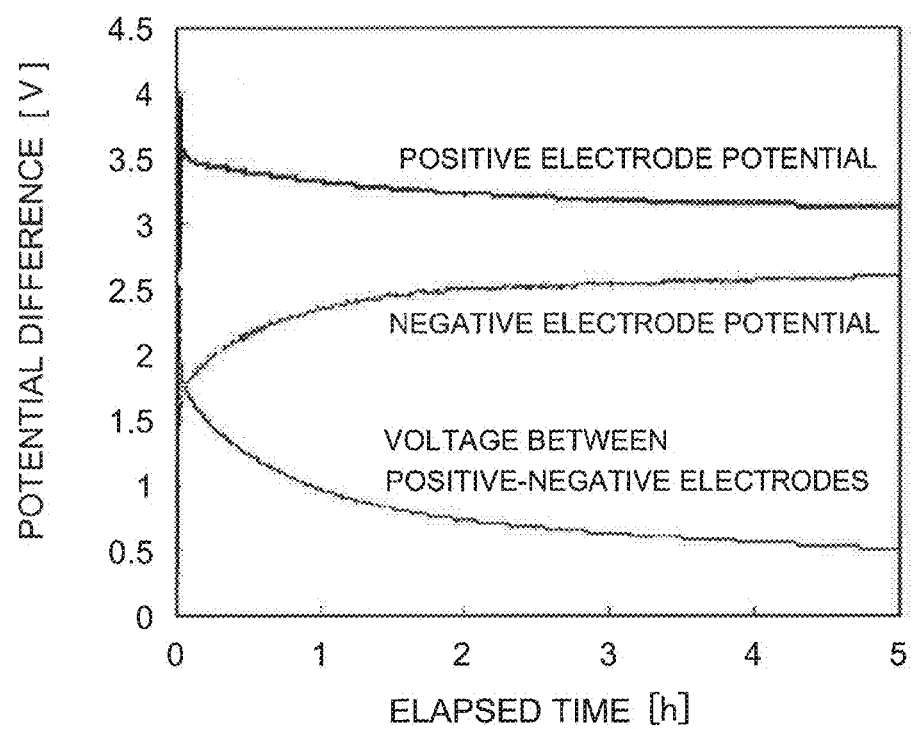
FIG. 10A is a diagram illustrating an example of potential behavior in a conventional abatement treatment step of a foreign metal.

FIG. 9 illustrates the data depicted in FIG. 8, in the form of a relationship between dissolution amount and confining pressure. As FIG. 9 shows, the dissolution amount of iron (Fe) particles is not overly influenced in a confining pressure region where the confining pressure is absent (0.1 MPa or lower), but the dissolution amount decreases as the confining pressure increases, and dissolution takes time, in a confining pressure region of 0.2 MPa or higher. More specifically, therefore, given a standard charging sustain time for a predetermined confining pressure region set beforehand in a state where the cell is restrained by a restraining jig (see FIG. 5), the charging time can be set in such a manner that charging over a time shorter than the standard charging sustain time is performed when the actual confining pressure is lower than the predetermined confining pressure region, and the charging time can be set in such a manner that charging over a time longer than the standard charging sustain time is performed when the actual confining pressure is higher than the predetermined temperature region, for instance as denoted by step C20 in FIG. 1.

The conditions of environmental temperature and the confining pressure in the micro-charging step of the present embodiment are set to vary, but other conditions may be caused to vary, to work out thereby a relationship between the dissolution amount and the other conditions for the standard charging sustain time, so that a charging sustain time is set that is more appropriate than in instances where the above conditions of environmental temperature and confining pressure vary. Further, step C10 and step C20 in FIG. 1 are not essential steps, and a more appropriate charging time can be set by using either one or both steps. In a case where both step C10 and step C20 are executed, the conditions of environmental temperature and confining pressure are necessarily set as respective individual steps, and the charging time need not be set taking this order into consideration. For instance, the charging time may be set taking into consideration the environmental temperature and the confining pressure concertedly.

As exemplified in the present embodiment, the micro-charging step disclosed herein can be performed on a single cell, and can be performed on the entirety of an assembled battery resulting from constructing an assembled battery through electrical connection of a plurality of cells. Herein, the assembled battery is not limited, for instance, by the presence or absence or confining pressure or by the magnitude of the confining pressure, and it suffices that the assembled battery be of a form resulting from electrically connecting a plurality of cells. The form in which the plurality of cells is disposed is not particularly limited. For instance, a cushioning material also referred to as spacer may be sandwiched between adjacent cells; alternatively, the cells may be directly connected to each other. The cells may be all accommodated in a predetermined assembled battery case; alternatively, some cells may be fixed by a predetermined assembled battery holder or the like. Once the cells are housed, an assembled battery may be constructed by using a jig or the like having the function of imparting an arbitrary confining pressure to the plane of the cells, as illustrated for instance in FIG. 5.

The term confining pressure denotes pressure applied in a direction that is substantially perpendicular to the stacking plane of the positive electrode and the negative electrode (and which typically coincides with the plane of the cells); the confining pressure may be applied on the single cells or the assembled battery. The confining pressure can be worked out on the basis of calculations, using for instance a load cell or a strain gauge.

Thanks to the micro-charging step, the foreign metal mixed into the cell is dissolved, and can then diffuse, in an ionic state, into the electrolyte. Upon a potential drop in the initial conditioning charging step (S40) that is performed subsequently, as illustrated in FIG. 1, the ions of the foreign metal, in a state of having sufficiently diffused into the cell, precipitate very thinly over a wide area on the negative electrode (preferably, over the entirety of the negative electrode). Accordingly, local precipitation at predetermined sites of the negative electrode is curtailed when the foreign metal ions reach the negative electrode after diffusing. Foreign metal mixed into the cell is abated as a result, since such precipitation cannot give rise to short-circuits.

The specific charging treatment and the like in the initial conditioning step are not particularly limited, and for instance a charging treatment under various conditions may be carried out such that the secondary battery of interest can be activated with good performance. For instance, an operation may be repeatedly carried out wherein, once the battery has been charged to an appropriate charge amount, the battery is left to stand over a predetermined time, and is then discharged down to a predetermined voltage. In the initial conditioning step the secondary battery is charged up to a predetermined battery capacity.

The production method disclosed herein may further include a self-discharge inspection step after the initial conditioning step. In the self-discharge inspection step, the occurrence or absence of internal short circuits is determined by measuring the voltage drop amount of the cell that has been charged as a result of the initial conditioning. Herein, internal short circuits to be inspected are very minute short-circuits derived from localized precipitation of foreign metal remaining on the positive electrode-side. To measure accurately the occurrence or absence of such minute short-circuits, accordingly, inspection times have conventionally lasted, for instance, at least about 5 days, and even about 10 days, depending on the circumstances. Such prolonged lengths of time account for cases where residual iron (Fe), which has high resistance and takes time to dissolve, might remain, as a foreign metal, in the cell; the inspection time is set thus on the basis of the finding that the measurement of internal short circuits caused by iron (Fe) requires a period of time of 5 or more days.

In the production method disclosed herein, by contrast, iron (Fe) that takes time to dissolve is abated by being reliably dissolved in the micro-charging step, and by being caused, in the subsequent initial conditioning step, to thinly precipitate, in a diffused state, on the negative electrode. Accordingly, the possibility of internal short circuits derived from iron (Fe) need not be addressed in self-discharge inspection. In the self-discharge inspection step, therefore, it suffices for instance to ascertain the occurrence or absence of internal short circuits caused by a metal species other than iron (Fe). Such an inspection can be conducted, for instance, within 24 hours, more restrictively within 15 hours, preferably within 10 hours, and further within about 2 to 5 hours. The significant length of time taken up by the self-discharge inspection step can be shortened as a result, and productivity can be noticeably increased.

Further, the occurrence or absence of short-circuits for copper (Cu), which, thanks to its low resistance, can be excluded from the targets of dissolution in the micro-charging step disclosed herein, can be ascertained over about several hours (for instance, 1 to 2 hours). Abatement of foreign metals including copper (Cu) that are mixed into the secondary battery may be accomplished in accordance with other methods not disclosed herein. As an example, for instance, a method may be resorted to that involves repeating, two or more times, an operation of pulsed charging to less than 0.01% of the cell capacity, to elicit thereby dissolution and diffusion of copper (Cu).

The secondary battery produced in accordance with the production method disclosed herein is not particularly limited as regards the specific configuration, form, capacity use and so forth of the battery. The invention of the present application will be explained specifically next with reference to accompanying drawings, as appropriate, on the basis of an example of a lithium ion battery as an instance of a secondary battery.

Figure 5:
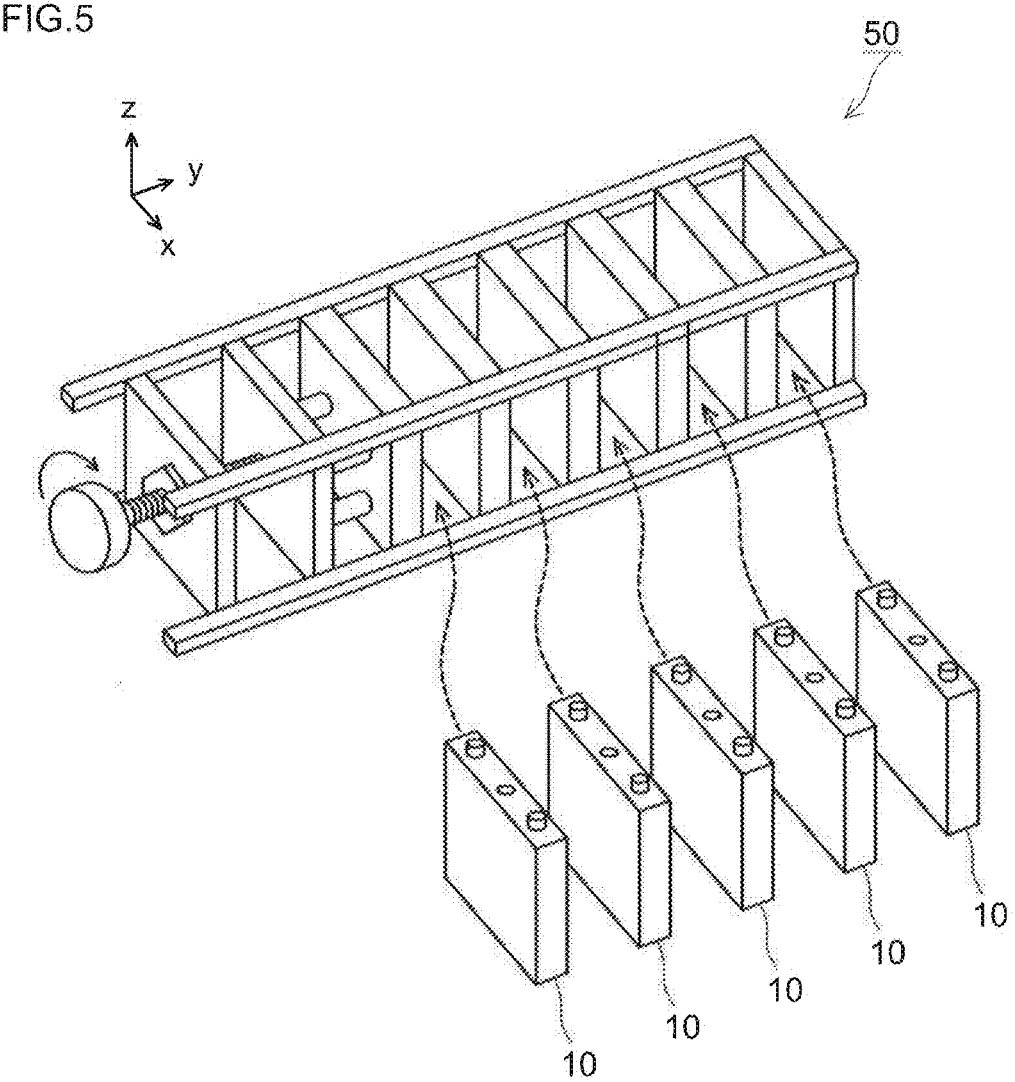
FIG. 5 is a perspective-view diagram for explaining restraining of a plurality of secondary batteries.

The lithium ion battery includes a flat square battery case (see, for instance, FIG. 5). An electrode assembly is accommodated in the battery case. The electrode assembly is configured in the form of a stack of a positive electrode, a negative electrode, and two separators, all shaped in the form of sheets. Typically, the foregoing are superposed on each other as separator, positive electrode, separator and negative electrode, and the resulting stack is wound. The wound electrode assembly is formed to a flat shape, by being pressed from the sides, so as to match the shape of the battery case.

In the positive electrode, typically, a positive electrode active material layer having a positive electrode active material is formed on the surface of a positive electrode collector. The positive electrode active material layer is typically formed on both faces of the positive electrode collector, but may be formed on one face. In the negative electrode, a negative electrode active material layer having a negative electrode active material is formed on the surface of a negative electrode collector. The negative electrode active material layer is typically formed on both faces of the negative electrode collector, but may be formed on one face. An uncoated section at which the positive electrode active material layer is not formed is provided at one edge section of the positive electrode collector, in the longitudinal direction of the positive electrode collector. A positive electrode terminal is connected to this uncoated section. Likewise, an uncoated section at which the negative electrode active material layer is not formed is provided at one edge section of the negative electrode collector, in the longitudinal direction of the negative electrode collector. A negative electrode terminal is connected to this uncoated section.

The electrode assembly having the positive electrode terminal and the negative electrode terminal connected thereto is inserted in the battery case, a nonaqueous electrolyte is supplied into the battery case, and the battery case is then sealed. The lithium ion battery can be thus constructed as a result.

A conductive member formed of a metal of good conductivity, similar to conductive members of collectors that are used in the positive electrode of conventional lithium secondary batteries (typically, lithium ion batteries) is preferably used as the positive electrode collector. For instance, a metal having aluminum, nickel, titanium, iron or the like as a main component, or an alloy having the foregoing as a main component, can be used herein. The shape of the positive electrode collector is not particularly limited, and various shapes can be conceivable, depending on, for instance, the shape of the of the lithium secondary battery. Examples of various forms that can be adopted include, for instance, rod-like, plate-like, sheet-like, foil-like and mesh-like shapes. Typically, a sheet-like positive electrode collector made of aluminum is used herein.

A lithium-containing transition metal oxide capable of storing and releasing lithium is used as the positive electrode active material. Herein, one, two or more of substances conventionally used in lithium secondary batteries (for instance, oxides of rock-salt structure, layered structure or spinel structure) can be used without any particular limitations. Examples thereof include, for instance, lithium-containing complex oxides such as lithium nickel complex oxides, lithium cobalt complex oxides, lithium manganese complex oxides, lithium magnesium complex oxides and the like. A ternary lithium-containing transition metal oxide that contains manganese, nickel and cobalt (in particular, a ternary lithium-containing transition metal oxide where the content of nickel is lower than 50 mol % among the transition metals that make up the lithium-containing complex oxide) can be cited as an example of the positive electrode active material that allows the advantages of the present invention to be brought out more effectively.

For instance, the term lithium nickel complex oxide encompasses, other than α-NaFeO$_2$ lithium nickelate (LiNiO$_2$) having lithium (Li) and nickel (Ni) as constituent metals, also oxides that contain at least one metal element other than lithium or nickel, at the nickel sites (transition metal sites) of LiNiO$_2$ (i.e. transition metal element and/or typical metal element other than Li or Ni) such that the proportion of nickel is kept at 50% or above. Examples of the metal element other than Li or Ni include, for instance, one, two or more metal elements selected from the group consisting of cobalt (Co), aluminum (Al), manganese (Mn), chromium (Cr), iron (Fe), vanadium (V), magnesium (Mg), titanium (Ti), zirconium (Zr), niobium (Nb), and molybdenum (Mo), tungsten (W), copper (Cu), zinc (Zn), gallium (Ga), indium (In), tin (Sn), lanthanum (La) and cerium (Ce). The same considerations apply to lithium cobalt complex oxides, lithium manganese complex oxides and lithium magnesium complex oxides.

Other examples include, for instance, so-called ternary overlithiated transition metal oxides containing three transition metal elements and represented by formula:

$$Li(Li_aMn_xCo_yNi_z)O_2$$

(where a, x, y and z satisfy a+x+y+z=1), and so-called solid solution overlithiated transition metal oxides represented by formula $$xLi[Li_{1/3}Mn_{2/3}]O_2 \cdot (1-x)LiMeO_2$$

(where Me is one, two or more of transition metal, and x satisfies 0<x≤1).

The compounds that make up such a positive electrode active material can be prepared and provided for instance in accordance with known methods. For instance, the target lithium-containing complex oxide can be prepared by mixing, at predetermined molar ratios, various starting compounds appropriately selected in terms of atomic composition, and by firing the resulting mixture at a predetermined temperature, using appropriate means. The fired product is crushed, granulated and sorted by resorting to appropriate means; as a result, a granular positive electrode active material powder can be obtained that is substantially made up of secondary particles having a desired average particle size and/or particle size distribution. The preparation method itself of the positive electrode active material (lithium-containing complex oxide powder or the like) is not a characterizing feature of the present invention.

Besides the above positive electrode active material, the positive electrode active material layer can contain, as needed, a conductive material, a binder and so forth. For instance, carbon materials such as carbon black (for instance, acetylene black, furnace black, Ketjen black or the like), or a graphite powder can be preferably used herein as the conductive material. The conductive material may be used singly or concomitantly in combinations of two or more of them. As the binder there can be preferably used a polymer material that dissolves or disperses in water. Examples of (water-soluble) polymer materials that dissolve in water include, for instance, cellulosic polymers such as such as carboxymethyl cellulose (CMC), methyl cellulose (MC), cellulose acetate phthalate (CAP), hydroxypropyl methylcellulose (HPMC) and the like; as well as polyvinyl alcohol (PVA). Examples of polymer materials that disperse in water (water-dispersible polymers) include, for instance, vinyl-based polymers such as polyethylene (PE), polypropylene (PP) and the like; polyethylene oxide (PEO); fluororesins such as polytetrafluoroethylene (PTFE), tetrafluoroethylene-perfluoroalkyl vinyl ether copolymers (PFA) and the like; vinyl acetate copolymers; and rubbers such as styrene-butadiene rubber (SBR) and the like. The binder is not limited to an aqueous binder, and a solvent-based binder such as polyvinylidene fluoride (PVDF) can be used herein.

Although not particularly limited thereto, the amount of conductive material that is used, with respect to 100 parts by mass of the positive electrode active material, can be set to range, for instance, from 1 to 20 parts by mass (preferably, 5 to 15 parts by mass). The amount of binder that is used, with respect to 100 parts by mass of the positive electrode active material, can be set to range, for instance, from 0.5 to 10 parts by mass.

A conductive member formed of a metal of good conductivity is preferably used in the negative electrode collector. For instance, a copper material, a nickel material or an alloy material having the foregoing as main constituents can be preferably used herein. The shape of the negative electrode collector may be identical to the shape of the positive electrode. A sheet-like negative electrode collector made of copper is typically used herein.

The negative electrode active material may be a material capable of storing and releasing lithium; herein there can be used, without any particular limitations, one, two or more of negative electrode active materials conventionally used in lithium secondary batteries. Examples thereof include, for instance, carbon materials such as graphite, oxide materials such as lithium titanium oxide ($Li_4Ti_5O_{12}$) or the like, metals such as tin, aluminum (Al), zinc (Zn), silicon (Si) or the like, or metallic materials made up of metal alloys having any of the foregoing metal elements as main constituents. In a typical example, there is used a particulate carbon material (carbon particles) that includes, at least partly, a graphite structure (layered structure). A so-called graphitic material (graphite), a hardly graphitizable carbonaceous material (hard carbon), an easily graphitizable carbonaceous material (soft carbon), a non-crystalline material (amorphous carbon), as well as any carbon material having a structure resulting from combining the foregoing, can also be used, as appropriate.

In addition to the negative electrode active material, the negative electrode active material layer that is formed in the negative electrode can further contain, as needed, for instance one, two or more of the materials that are formulated in the positive electrode active material layer. As such materials there can be used herein the same of materials that can function as conductive materials, binders and dispersants and so forth listed as constituent materials of the positive electrode active material layer. An aqueous binder can be preferably used as the binder. However, the binder is not limited to an aqueous binder, and a solvent-based binder such as polyvinylidene fluoride (PVDF) can be used herein.

Although not particularly limited thereto, the amount of conductive material that is used with respect to 100 parts by mass of the negative electrode active material can be set, for instance, to a range of about 1 to 30 parts by mass (preferably, of about 2 to 20 parts by mass, for instance, about 5 to 10 parts by mass). The amount of binder that is used, with respect to 100 parts by mass of the negative electrode active material can be set to range, for instance, from 0.5 to 10 parts by mass.

The positive electrode and the negative electrode according to the present embodiment can be produced in accordance with an ordinary method. Specifically, there is prepared a paste-like composition (referred to hereafter as active material layer forming paste), resulting from dispersing the above active material, binder and so forth in an appropriate solvent (water, organic solvent or the like), as in conventional instances. The prepared active material layer forming paste is coated onto a collector and is dried, followed by compression (pressing), to yield thereby an electrode provided with an active material layer on the collector.

The nonaqueous electrolyte contains a lithium salt, as a supporting salt, in an organic solvent (nonaqueous solvent). A liquid nonaqueous electrolyte at normal temperature (i.e. an electrolyte solution) can be used preferably herein. A known lithium salt that is conventionally used as a supporting salt in the nonaqueous electrolyte of a lithium secondary battery can be appropriately selected and used as the lithium salt. Examples of such lithium salts include, for instance, $LiPF_6$, $LiBF_4$, $LiClO_4$, $LiAsF_6$, $Li(CF_3SO_2)_2N$, $LiCF_3SO_3$ and the like. The supporting salt can be used singly as one alone, or as a combination of two or more. In a particularly preferred example, the lithium salt is $LiPF_6$. Various additives, typified by gas-generating additives, film-forming additives and the like may be added, as needed, to the nonaqueous electrolyte.

An organic solvent that is used in ordinary lithium secondary batteries can be appropriately selected and used as the above nonaqueous solvent. Particularly preferred examples of nonaqueous solvents include carbonates such as ethylene carbonate (EC), dimethyl carbonate (DMC), ethyl methyl carbonate (EMC), diethyl carbonate (DEC), propylene carbonate (PC) and the like. These organic solvents can be used as one alone or as a combination of two or more.

A separator identical to conventional ones can be used as the separator. For instance, a porous sheet (microporous resin sheet) made of a resin can be preferably used as the separator. Preferred examples of the constituent material of such a porous sheet include, for instance, polyolefin resins such as polyethylene (PE), polypropylene (PP), polystyrene and the like. In particular, for instance, a PE sheet, a PP sheet, a two-layer structure sheet resulting from layering a PE layer and a PP layer, or a three-layer structure sheet of a form where one PE layer is sandwiched between two PP layers, can be preferably used as the porous polyolefin sheet. In a case where a solid-state electrolyte or a gel electrolyte is used as the electrolyte, the separator may in some instances be omitted (i.e. the electrolyte itself can function as a separator in such cases).

Figure 6:
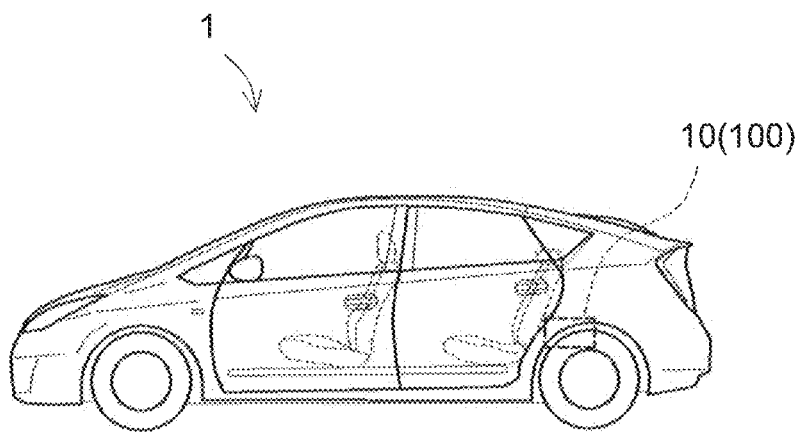
FIG. 6 is a side-view diagram illustrating an example of a vehicle provided with a secondary battery according to an embodiment.
Figure 7A:
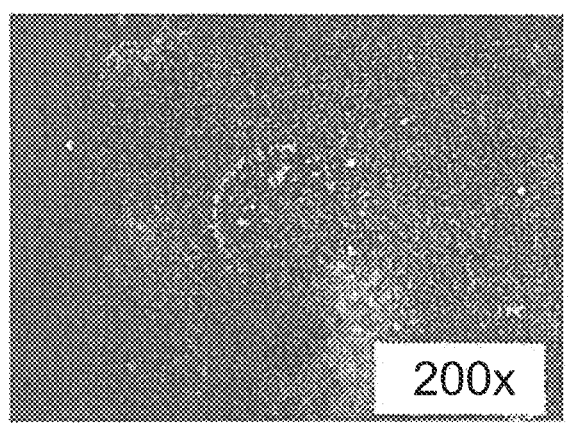
FIG. 7A is an observed image depicting a positive electrode surface after a micro-charging step according to an embodiment.
Figure 7B:
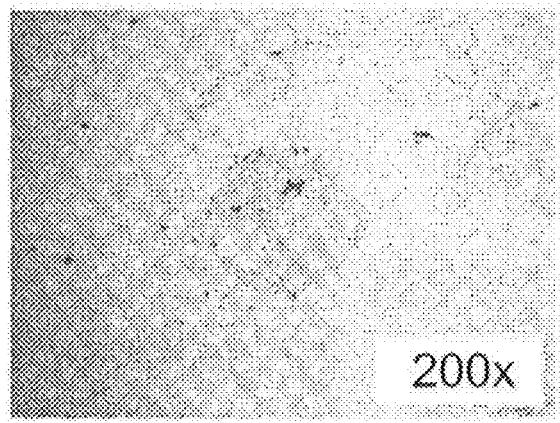
FIG. 7B is an observed image depicting a positive electrode-side surface of a separator after a micro-charging step according to an embodiment.
Figure 7C:
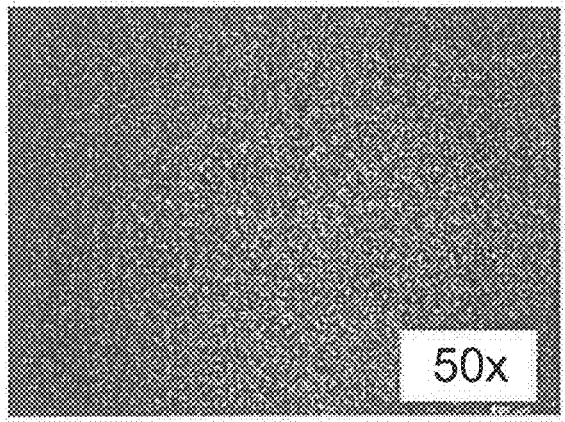
FIG. 7C is an observed image depicting a negative electrode surface after a micro-charging step according to an embodiment.
Figure 7D:
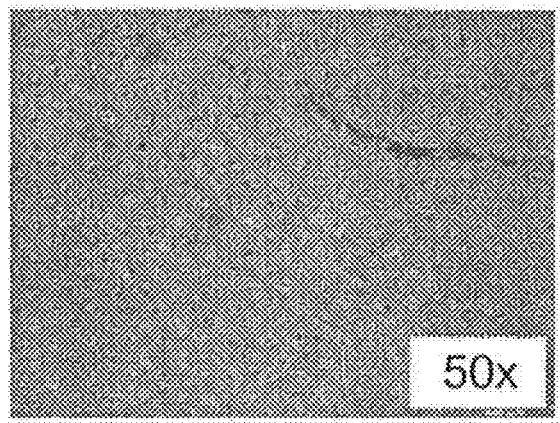
FIG. 7D is an observed image depicting a negative electrode-side surface of a separator after a micro-charging step according to an embodiment.

The use of the lithium secondary battery according to the present embodiment is not particularly limited. As described above, the lithium secondary battery according to the present embodiment allows reliably preventing, in a short time, the occurrence of internal short circuits that are caused by the foreign metal that is mixed into the cell. Accordingly, safety and reliability can be enhanced, and various characteristics can be brought out to the fullest. Accordingly, the lithium secondary battery according to the present embodiment can be suitably used, in particular, as a power source for motors (electric motors) that are installed in vehicles such as automobiles. For instance, the lithium ion battery 10 (which may be in the form of an assembled battery 100) can be suitably used as the power source of a vehicle driving motor that is installed in a vehicle 1 such as an automobile, as illustrated in FIG. 6. The type of the vehicle 1 is not particularly limited, and the vehicle 1 may be typically a hybrid automobile, an electric automobile, a fuel cell automobile or the like. The lithium ion battery 10 may be used singly, or may be used in the form of an assembled battery resulting from connecting a plurality of lithium ion batteries 10 in series and/or in parallel.

A working example of the present invention will be explained next. The explanation below is not meant to limit the present invention to such specific example.

Micro-Charging Step Evaluation

Preparation of a Cell for Evaluation

A small laminate cell for evaluation (lithium secondary battery) was constructed in accordance with the procedure below.

Firstly, a positive electrode active material layer forming paste was prepared by mixing a ternary lithium transition metal oxide ($LiNi_{1/3}Mn_{1/3}Co_{1/3}O_2$) as a positive electrode active material, acetylene black (AB) as a conductive material, and polyvinylidene fluoride (PVDF) as a binder, with deionized water, to yield a mass ratio of the foregoing materials of 87:10:3. The positive electrode active material layer forming paste was coated onto one face of a positive electrode collector in the form of an aluminum foil (15 μm thick) and was dried in such a manner that the coverage amount of the positive electrode active material per unit surface area of the aluminum foil was about 12 mg/cm$^2$. After drying, the whole was shaped through drawing in a roller press, to a sheet-like shape having a thickness of about 90 µm, and slits were formed such that the positive electrode active material layer had a predetermined width, to produce a positive electrode having dimensions of about 23 mm×23 mm.

Foreign metal model particles made of Fe having a diameter of 200 µm and a thickness of 10 µm, as the foreign metal, were deposited on the active material layers of the positive electrode thus produced.

Next, a negative electrode active material layer forming paste was prepared by mixing graphite, as the negative electrode active material, a styrene-butadiene block copolymer (SBR), as a binder, and carboxymethyl cellulose (CMC), as a thickener, with deionized water, to a mass % ratio of the foregoing materials of 98:1:1. This paste was coated onto one face of a negative electrode collector in the form of a copper foil (10 µm thick) and was dried in such a manner that the coverage amount of the negative electrode active material per unit surface area of the copper foil was about 6.5 mg/cm$^2$. After drying, the whole was shaped through drawing in a roller press, to a sheet-like shape having a thickness of about 60 µm, and slits were formed such that the negative electrode active material layer had a predetermined width, to produce a negative electrode having dimensions of about 25 mm×25 mm.

Assembly of a Cell for Evaluation

A laminate cell for evaluation was constructed using the positive electrode and the negative electrode that were prepared. Specifically, the positive electrode and the negative electrode produced above were stacked, with a separator interposed in between, in such a manner that the active material layers of the electrodes opposed each other, to produce thereby an electrode assembly. To measure the lithium-basis potentials of the positive electrode and the negative electrode, a reference electrode in which a metallic lithium foil was affixed to a nickel lead, was disposed, on the negative electrode side of the separator, spaced apart from the negative electrode. A three-layer film (PP/PE/PP film) made up of polypropylene/polyethylene/polypropylene was used as the separator.

The electrode assembly was accommodated, together with a nonaqueous electrolyte solution, into a bag-like battery container made of laminate, and the battery container was sealed, to construct a lithium secondary battery for testing. The nonaqueous electrolyte (electrolyte solution) used herein was obtained by dissolving 1 mol/L of LiPF$_6$ (LPFO), as a lithium salt, and 0.05 mol/L of Li[B(C$_2$O$_4$)$_2$], as an additive, in a mixed solvent of ethylene carbonate (EC), dimethyl carbonate (DMC) and ethyl methyl carbonate (EMC), to a ratio (volume ratio) of 3:3:4. The amount of electrolyte solution used was set to 0.025 ml, and the impregnation time of the electrolyte solution was set to 5 hours.

The capacity of this small laminate cell for evaluation is 3.7 mAh.

Micro-Charging Step

A micro-charging step under the conditions below was performed on the small laminate cell for evaluation thus constructed. Specifically, CC charging was performed until a condition was attained of voltage between the positive and negative electrodes of 0.8 V, at 0.015 mA (0.004 C). Further, CV charging was performed, while maintaining the positive-negative voltage, until the total micro-charging time reached 10 hours. The potential behavior in the micro-charging step is illustrated in FIGS. 2 to 4.

Evaluation

The cell for evaluation after the micro-charging step was dismantled, and the surfaces on both sides of the positive electrode, the negative electrode and the separator were observed using an optical microscope. FIG. 7A to FIG. 7D are, respectively, A: an observed image of the surface of the positive electrode, B: an observed image of the positive electrode-side surface of the separator, C: an observed image of the negative electrode surface, and D: an observed image of the negative electrode-side of the separator, all after micro-charging. These observation results revealed that performing micro-charging caused substantially all Fe-made foreign metal model particles, disposed on the positive electrode, to dissolve, and that, after dissolving, the model particles precipitated lightly on the positive electrode-side surface of the separator, while no precipitation could be observed on the negative electrode-side surface of the separator or on the negative electrode surface.

It was thus found that abatement treatment could be performed, in that the foreign metal on the positive electrode dissolved stably in a short time, and did not precipitate on the active negative electrode, as a result of performing CC-CV charging between the positive and negative electrodes. It was found that, despite the fact that iron (Fe) is a high-resistance metal species, the abatement treatment of the foreign metal as a whole could be completed in 10 hours, even for comparatively large foreign metal bodies formed of Fe and having a diameter of 200 µm and a thickness of 10 µm.

Therefore, the inspection time in self-discharge inspection after the initial conditioning step can be shortened to several hours (for instance, about 5 hours), since it is deemed that there is no likelihood of short-circuits arising due to iron foreign metal. Although continued charging is performed in the micro-charging step, the actual charge amount is very small, and hence the power source for charging is of a level such that, for instance, voltage derived from a button battery, a dry cell or the like, can be used as the power source. In view of the above, it is found that the cost increase incurred on account of continual charging in the micro-charging step is more than offset by the effect that is elicited by such charging.

Influence of Environmental Temperature and Confining Pressure

A small laminate cell for evaluation was constructed in the same way as above. A micro-charging step was performed, under the conditions below, on the obtained small laminate cell for evaluation. Specifically, CC charging was performed until a condition was attained of voltage between the positive and negative electrodes of 0.8 V, at 0.015 mA (0.004 C). Further, CV charging was performed, while maintaining the positive-negative voltage, until the total micro-charging time reached 10 hours. In the micro-charging step, the environmental temperature was caused to vary from 21° C. to 29° C., and the confining pressure of the cell was caused to vary from about 0.04 MPa (unrestrained) to 0.85 MPa. The cell was tested for a number of samples n=10 for each condition.

The environmental temperature was adjusted by performing the micro-charging step in a constant-temperature bath set to a respective test temperature. The restraining force on each laminate cell was adjusted through application of pressure in a direction perpendicular to the electrode surface of the laminate cell, using a restraining jig with coil springs. The confining pressure actually exerted on the laminate cell was calculated based on a strain gauge attached to the restraining jig.

Evaluation

Each cell for evaluation after the micro-charging step was dismantled, and the amount of Fe-made foreign metal model particles remaining in the positive electrode was examined using an optical microscope, to calculate thereby the dissolution amount of foreign metal having dissolved as a result of the micro-charging step. The results are illustrated in FIG. 8 and FIG. 9. FIG. 8 and FIG. 9 are plots based on the same data, but FIG. 8 illustrates a relationship between dissolution amount and environmental temperature, while FIG. 9 illustrates a relationship between dissolution amount and confining pressure. The markers in FIG. 8 and FIG. 9 denote average values (n=10), and the bars denote data variability.

The dissolution amount was calculated by using the projected area of the Fe-made foreign metal model particles that were mixed into the positive electrode. Specifically, each cell after completion of the micro-charging step was dismantled, and electron micrographs of the residual melted Fe-made foreign metal model particles on the positive electrode surface or on the separator positive electrode-side surface were acquired; the dissolution amount was then calculated by subtracting the projected area of the melt residual portion from the projected area of the model particles that had been mixed in initially. The projected area was obtained by identifying visually the contour of the model particles, from the obtained electron micrographs, and by calculating the surface area surrounded by the contour line by screen processing.

The projected area for a same model particle image was calculated five times, to evaluate projected area variability by visual contour identification. As a result, it was found that the standard deviation 1σ was about 30 to 100 μm², which was deemed to be negligibly small enough as compared with 3000 to 5000 μm², which is the standard deviation 1σ of the dissolution amount among 10 cells (n=10). Such variability in the dissolution amount between cells is deemed to be variability caused by the "mixed-in state of the foreign metal model particles" in terms of, for instance, the buried state of the foreign metal model particles in the electrode, and the way in which the foreign metal model particles are in contact with the electrolyte solution.

FIG. 8 shows that the dissolution amount is substantially saturated at an environmental temperature of about 25° C. or above, and is not significantly influenced by confining pressure, temperature or dissolution amount. The maximum of variability (1σ) of the projected area for calculating the dissolution amount is about 6700 μm²; accordingly, a dissolution amount (2500 μm²) worked out as an approximation of initial projected area (31416 μm²)—maximum variability of projected area (6700 μm²) can be regarded as one abatement completion level. It was found that for a restraining force of 0.42 MPa or less, the Fe foreign metal having φ200 μm×thickness 10 μm dissolves substantially within 10 hours, and the above abatement completion level is attained, if the environmental temperature is 25° C. or higher.

However, some instances were observed where the dissolution amount was significantly influenced by the confining pressure, for an environmental temperature of 25° C. or lower. For instance, it is found that when the environmental temperature drops from 25° C. to 22° C., the dissolution amount is halved if the confining pressure is 0.42 MPa or higher.

FIG. 9 shows that the dissolution amount is not significantly influenced by confining pressure if the environmental temperature is about 25° C. or higher. However, it can be observed that the dissolution amount decreases as the environmental temperature drops, and that the dissolution amount is significantly influenced by the confining pressure in the range of environmental temperature below 25° C. For instance, it is found that if the environmental temperature drops below 25° C., the dissolution amount is halved when the confining pressure is increased from no pressure to about 0.2 MPa.

Therefore, it is found that foreign metal abatement can be performed more reliably by, for instance, prolonging the charging sustain time to 20 hours in the micro-charging step for a secondary battery at, for instance, 22° C. and with a confining pressure of 0.42 MPa or higher, as the setting for the charging sustain time.

Further, foreign metal abatement can be carried out more reliably by, for instance, prolonging the charging sustain time to 20 hours in the micro-charging step of a secondary battery with a confining pressure of 0.2 MPa or higher at, for instance, 22° C.

The lithium secondary battery obtained in accordance with the production method disclosed herein is provided, at a low cost, as a highly reliable lithium secondary battery in which a foreign metal, if any, that is mixed in during construction of a cell is abated in a subsequent micro-charging step and initial conditioning step, without impacting on battery performance.

The present invention has been explained on the basis of preferred embodiments, but the description of the embodiments is not limiting, and needless to say the embodiments may accommodate various modifications.

INDUSTRIAL APPLICABILITY

The technology disclosed herein provides a method that allows producing, in a shorter time and with good productivity, a secondary battery in which short-circuits do not occur even if a foreign metal is mixed into the secondary battery. A safer highly reliable secondary battery can be provided thanks to that production method. Accordingly, the present invention can provide also the vehicle 1 (typically, an automobile, in particular an automobile provided with an electric motor, such as a hybrid automobile or an electric automobile) that is equipped with the secondary battery 10 (which may be in the form of the assembled battery 100 resulting from connecting in series a plurality of the batteries 10), as illustrated in FIG. 6.

REFERENCE SIGNS LIST

1 vehicle
10 lithium ion battery
50 restraining jig
100 assembled battery

The invention claimed is:

1. A method for producing a secondary battery that includes a positive electrode provided with a positive electrode active material layer, a negative electrode provided with a negative electrode active material layer, and a nonaqueous electrolyte, the method comprising:

constructing a cell including the positive electrode, the negative electrode and the nonaqueous electrolyte;

as a microcharging step, performing charging over a charging time of at least one hour, up to 0.01% to 0.5% of a capacity of the constructed cell, in a state of charge such that a positive electrode potential is equal to or higher than an oxidation potential of iron (Fe) and equal to or lower than an oxidation potential of copper (Cu), and a negative electrode potential is equal to or higher than a reduction potential of iron (Fe) and lower than the positive electrode potential, and maintaining the state of charge actively until the influence of a foreign metal is nullified; and performing an initial conditioning charging after the micro-charging step.

2. The method for producing a secondary battery according to claim 1, wherein the micro-charging step is performed by constant-current constant-voltage (CC-CV) charging, and a current at the time of CC charging is set to 0.01 C or less.

3. The method for producing a secondary battery according to claim 2, wherein in the micro-charging step, a potential difference between the positive and negative electrodes at the time of CV charging is set to range from 0.5 V to 1.3 V.

4. The method for producing a secondary battery according to claim 2, wherein in the micro-charging step, a potential difference between the negative electrode and an exterior can at the time of CV charging is set to range from −0.5 V to 0.2 V.

5. The method for producing a secondary battery according to claim 1, wherein the micro-charging step is performed by constant-current constant-voltage charging, and the state of charge is maintained from 5 hours to 24 hours.

6. The method for producing a secondary battery according to claim 1,
wherein given a preset standard charging sustain time for a predetermined temperature region,
a time for maintaining the state of charge is set in such a manner that charging over a time longer than the standard preset charging sustain time is performed when an actual environmental temperature is lower than the predetermined temperature region, and
the time for maintaining the state of charge is set in such a manner that charging over a time shorter than the standard preset charging sustain time is performed when the actual environmental temperature is higher than the predetermined temperature region.

7. The method for producing a secondary battery according to claim 1, wherein an assembled battery is constructed through electrical connection of a plurality of cells constructed in the cell construction step, and the micro-charging step is performed on the entirety of the constructed assembled battery.

8. The method for producing a secondary battery according to claim 1,
wherein given a preset standard charging sustain time for a predetermined confining pressure region,
a time for maintaining the state of charge is set in such a manner that charging over a time shorter than the standard preset charging sustain time is performed when an actual confining pressure is lower than the predetermined confining pressure region, and
the time for maintaining the state of charge is set in such a manner that charging over a time longer than the standard preset charging sustain time is performed when the actual confining pressure is higher than the predetermined confining pressure region.

9. The method for producing a secondary battery according to claim 1,
further comprising, after the initial conditioning charging step, a self-discharge inspection step of measuring a voltage drop amount of the charged cell,
wherein the self-discharge inspection step is performed within 15 hours.

* * * * *